US007209051B2

(12) United States Patent
Shankwitz et al.

(10) Patent No.: US 7,209,051 B2
(45) Date of Patent: Apr. 24, 2007

(54) INTERSECTION ASSISTANCE SYSTEM AND METHOD

(75) Inventors: Craig R. Shankwitz, Minneapolis, MN (US); Lee Alexander, Woodbury, MN (US); Pi-Ming Cheng, Roseville, MN (US); Max Donath, St. Louis Park, MN (US); Alec Gorjestani, Minneapolis, MN (US); Arvind Menon, Minneapolis, MN (US); Bryan Newstrom, Circle Pines, MN (US); Nicholas J. Ward, Minneapolis, MN (US)

(73) Assignee: University of Minnesota, Minneapolis, MN (US)

( * ) Notice: Subject to any disclaimer, the term of this patent is extended or adjusted under 35 U.S.C. 154(b) by 26 days.

(21) Appl. No.: 11/009,941

(22) Filed: Dec. 10, 2004

(65) Prior Publication Data

US 2005/0174257 A1 Aug. 11, 2005

Related U.S. Application Data

(63) Continuation-in-part of application No. 10/091,182, filed on Mar. 5, 2002, now Pat. No. 7,072,764.

(60) Provisional application No. 60/528,313, filed on Dec. 10, 2003.

(51) Int. Cl.
*G08G 1/01* (2006.01)

(52) U.S. Cl. .................. 340/938; 340/907; 340/935; 701/301

(58) Field of Classification Search ............ 340/907, 340/909, 911, 933, 934, 935, 936, 937, 938; 701/117, 118, 119, 301; 707/104.1
See application file for complete search history.

(56) References Cited

U.S. PATENT DOCUMENTS 4,120,566 A 10/1978 Sanci et al. ............. 350/302

(Continued)

FOREIGN PATENT DOCUMENTS

EP 1 096 229 A1 3/2000

(Continued)

OTHER PUBLICATIONS

Development of Driving Support System for Patrol Under Poor Visibility—Evaluation of First Pilot Model -, pp. 1-7, Nov. 19, 2003.

(Continued)

*Primary Examiner*—Jeffery Hofsass
*Assistant Examiner*—Edny Labbees
(74) *Attorney, Agent, or Firm*—Westman, Champlin & Kelly, P.A.

(57) ABSTRACT

An intersection assistance system includes at least one vehicle sensor and a gap estimator. The vehicle sensor is configured to obtain vehicle information on vehicles approaching the intersection along a main roadway. The gap estimator is configured to estimate gap information relating to a gap between the vehicles based on the vehicle information. The gap information includes a length of the gap, a location of the gap, and a velocity of the gap. In a method of obtaining information for use in assisting a driver of an entering vehicle to safely enter an intersection, vehicle information is obtained on vehicles traveling toward the intersection on a main roadway. Next, gap information is estimated relating to a gap between the vehicles based on the vehicle information. The gap information includes a length of the gap, a location of the gap, and a velocity of the gap.

37 Claims, 5 Drawing Sheets

U.S. PATENT DOCUMENTS

| | | | |
|---|---|---|---|
| 5,214,757 A | 5/1993 | Mauney et al. | 395/161 |
| 5,231,379 A | 7/1993 | Wood et al. | 340/705 |
| 5,291,338 A | 3/1994 | Bezard et al. | 359/859 |
| 5,381,338 A | 1/1995 | Wysocki et al. | 701/207 |
| 5,414,439 A | 5/1995 | Groves et al. | 345/7 |
| 5,444,442 A * | 8/1995 | Sadakata et al. | 340/916 |
| 5,497,271 A | 3/1996 | Mulvanny et al. | 359/631 |
| 5,499,325 A | 3/1996 | Dugan, Jr. | 395/132 |
| 5,517,419 A | 5/1996 | Lanckton et al. | 701/216 |
| 5,543,789 A | 8/1996 | Behr et al. | 340/995 |
| 5,652,705 A * | 7/1997 | Spiess | 701/117 |
| 5,734,358 A | 3/1998 | Sumiyoshi | 345/7 |
| 5,761,630 A * | 6/1998 | Sekine et al. | 701/301 |
| 5,765,116 A | 6/1998 | Wilson-Jones et al. | 701/41 |
| 5,808,566 A | 9/1998 | Behr et al. | 340/995 |
| 5,826,212 A | 10/1998 | Nagai | 701/208 |
| 5,848,373 A | 12/1998 | DeLorme et al. | 701/200 |
| 5,872,526 A | 2/1999 | Tognazzini | 340/961 |
| 5,926,117 A | 7/1999 | Gunji et al. | 340/988 |
| 5,949,331 A | 9/1999 | Schofield et al. | 340/461 |
| 5,951,620 A | 9/1999 | Ahrens et al. | 701/200 |
| 5,953,722 A | 9/1999 | Lampert et al. | 707/100 |
| 5,966,132 A | 10/1999 | Kakizawa et al. | 345/419 |
| 5,978,737 A * | 11/1999 | Pawlowski et al. | 701/301 |
| 5,999,635 A * | 12/1999 | Higashikubo et al. | 382/104 |
| 5,999,878 A | 12/1999 | Hanson et al. | 710/208 |
| 6,038,496 A | 3/2000 | Dobler et al. | 701/3 |
| 6,038,559 A | 3/2000 | Ashby et al. | 707/4 |
| 6,047,234 A | 4/2000 | Cherveny et al. | 701/200 |
| 6,049,295 A * | 4/2000 | Sato | 340/928 |
| 6,104,316 A | 8/2000 | Behr et al. | 340/995 |
| 6,107,944 A | 8/2000 | Behr et al. | 340/995 |
| 6,120,460 A | 9/2000 | Abreu | 600/558 |
| 6,122,593 A | 9/2000 | Friederich et al. | 701/202 |
| 6,144,335 A | 11/2000 | Rogers et al. | 342/357.03 |
| 6,157,342 A | 12/2000 | Okude et al. | 342/357.13 |
| 6,161,071 A | 12/2000 | Shuman et al. | 701/48 |
| 6,166,698 A | 12/2000 | Turnbull et al. | 343/713 |
| 6,184,823 B1 | 2/2001 | Smith et al. | 342/357.13 |
| 6,188,957 B1 | 2/2001 | Bechtolsheim et al. | 701/209 |
| 6,192,314 B1 | 2/2001 | Khavakh et al. | 701/209 |
| 6,208,934 B1 | 3/2001 | Bechtolsheim et al. | 701/209 |
| 6,212,474 B1 | 4/2001 | Fowler et al. | 701/211 |
| 6,218,934 B1 | 4/2001 | Regan | 340/438 |
| 6,226,389 B1 | 5/2001 | Lemelson et al. | 382/104 |
| 6,249,742 B1 | 6/2001 | Friederich et al. | 701/202 |
| 6,253,151 B1 | 6/2001 | Ohler et al. | 701/208 |
| 6,272,431 B1 | 8/2001 | Zamojdo et al. | 701/211 |
| 6,278,942 B1 | 8/2001 | McDonough | 701/210 |
| 6,289,278 B1 | 9/2001 | Endo et al. | 701/208 |
| 6,297,516 B1 | 10/2001 | Forrest et al. | 257/40 |
| 6,298,303 B1 | 10/2001 | Khavakh et al. | 701/209 |
| 6,308,177 B1 | 10/2001 | Israni et al. | 707/100 |
| 6,314,365 B1 | 11/2001 | Smith | 701/200 |
| 6,314,367 B1 | 11/2001 | Ohler et al. | 701/208 |
| 6,361,321 B1 | 3/2002 | Huston et al. | 434/69 |
| 6,370,475 B1 | 4/2002 | Breed et al. | 701/301 |
| 6,385,539 B1 | 5/2002 | Wilson et al. | 701/213 |
| 6,405,132 B1 | 6/2002 | Breed et al. | 701/301 |
| 6,438,491 B1 | 8/2002 | Farmer | 701/301 |
| 6,486,856 B1 | 11/2002 | Zink | 345/7 |
| 6,526,352 B1 | 2/2003 | Breed et al. | 701/213 |
| 6,587,778 B2 * | 7/2003 | Stallard et al. | 701/117 |
| 6,690,268 B2 | 2/2004 | Schofield et al. | 340/438 |
| 2002/0036584 A1 * | 3/2002 | Jocoy et al. | 342/70 |
| 2002/0184236 A1 | 12/2002 | Donath et al. | 707/104.1 |
| 2003/0023614 A1 | 1/2003 | Newstrom et al. | 707/104.1 |
| 2003/0128182 A1 | 7/2003 | Donath et al. | 345/156 |
| 2004/0066376 A1 | 4/2004 | Donath et al. | 345/169 |

OTHER PUBLICATIONS

"See the Road Ahead," GPS—Augmented Reality Aids Drivers, Nov. 1, 2003, by: Stephen Scott-Young, GPS World (14 pages).

Office Communication for U.S. Appl. No. 09/618,613, filed Jul. 18, 2000, dated Dec. 12, 2003.

Office Communication from U.S. Appl. No. 09/618,613, filed Jul. 18, 2000. Date of Office Communication Feb. 6, 2004.

Course Notes, "Programming with Open GL: Advanced Techniques," 24th International Conference on Computer Graphics and Interactive Techniques, pp. 1-3, 83-102, 1997.

Office Communication for U.S. Appl. No. 09/968,724, filed Oct. 1, 2001, date mailed Mar. 29, 2004.

Office Communication for U.S. Appl. No. 09/618,613, filed Jul. 18, 2000, date mailed: May 17, 2004.

Preston, Howard; Storm, Richard; Donath, Max; and Shankwitz, Craig, Review of Minnesota's Rural Intersection Crashes: Methodology for Identifying Intersections for Intersection Decision Support (IDS), Mn/DOT Final Report MN/RC-2004-31, 2004.

Najm, W.J.; J.A. Koopmann and D.L. Smith. "Analysis of Crossing Path Crash Countermeasure Systems." Proceedings of the 17th International Technical Conference on the Enhanced Safety of Vehicles, Amsterdam, The Netherlands. Jun. 2001.

Chovan, J.D.; L. Tijerina; J.A. Pierowica; and D.L. Henricks. "Examination of Unsignalized Intersection Straight Crossing Path Crashes and Potential IVHS Countermeasures," Report DOT HS 808 152, DOT-VNTSC-NHTSA-94-2. Volpe National Transportation Systems Center, Washington, D.C., Aug. 1994.

Menon, Arvind; Gorjestani, Alec; Shankwitz, Craig; and Donath, Max. "Roadside Range Sensors for Intersection Decision Support," Proceedings of the 2004 IEEE ITS Conference (ITSC 2004), Washington, D.C., Oct. 2004.

U.S. Appl. No. 09/618,613, filed Jul. 18, 2000, entitled "Mobility Assist Device".

Office Communication for U.S. Appl. No. 09/968,724, filed Oct. 1, 2001. Date of Mailing: Jun. 5, 2006.

Office Communication for U.S. Appl. No. 10/197,273, filed Jul. 17, 2002. Date of Mailing: Jun. 7, 2006.

Office Communication for U.S. Appl. No. 10/626,953, filed Feb. 12, 2004. Date of Mailing Jul. 17, 2006.

Office Communication for U.S. Appl. No. 10/626,953, filed Feb. 12, 2004. Date of mailing: Jan. 3, 2006.

* cited by examiner

INTERSECTION ASSISTANCE SYSTEM AND METHOD

The present application claims the benefit of U.S. provisional patent application ser. No. 60/528,313, filed Dec. 10 2003, and is a continuation-in-part of U.S. patent application Ser. No. 10/091,182, filed Mar. 5, 2002, now U.S. Pat. No. 7,072,764, the content of which is hereby incorporated by reference in its entirety.

FIELD OF THE INVENTION

The present invention generally relates to systems and methods for assisting vehicles to safely perform intersection entering operations.

BACKGROUND OF THE INVENTION

Intersections between two-way highways and divided highways and minor roadways are often unsignalized, particularly in rural areas. Such unsignalized intersections are generally intersections that do not include an active gap regulating system (e.g., a stoplight) that operates to regulate gaps between vehicles traveling on the highway. Such unsignalized intersections also include thru-stop intersections that include a stop sign (or a yield sign) regulating the flow of traffic along the minor roadway, but do not include traffic regulation along the highway.

Unlike signalized intersections, unsignalized intersections do not regulate the flow of traffic along the highway (main roadway). As a result, the unsignalized intersection provides no assistance to the driver of the vehicle positioned at the intersection on the minor roadway (hereinafter "entering vehicle") regarding whether an intersection entering operation can be safely performed. As used herein, intersection entering operations include, for example, merging into an immediate lane of the highway (i.e., making a right turn), crossing the lanes of the highway and continuing along the minor roadway, and crossing one or more of the lanes of the highway and merging into a lane of the highway (i.e., making a left turn). Accordingly, it is up to the driver of the entering vehicle to determine when a sufficient gap exists between the vehicles approaching the intersection along the main roadway for the driver to safely perform a desired intersection entering operation.

Accidents often occur at unsignalized intersections. Such accidents can be the result of factors that are not in the control of the entering vehicle's driver, such as poor visibility situations, error on the part of the driver of the approaching vehicle (i.e., driving without lights at night, speeding, etc.), or a mechanical problem with the entering vehicle, for example.

However, such accidents can also be a result of the entering vehicle's driver failing to recognize that an insufficient gap exists between the intersection and an oncoming vehicle to safely perform an intersection entering operation. For example, the entering vehicle's driver may misinterpret the lane in which an approaching vehicle is occupying, or underestimate the gap between the entering vehicle and the approaching vehicle including a speed of the approaching vehicle and a distance the approaching vehicle is from the intersection.

There is a continuing need to improve the safety of our roads including at unsignalized intersections. To that end, there exists a need to provide entering drivers with assistance in selecting and identifying an appropriate gap between the unsignalized intersection and approaching vehicles along the main roadway that would allow the driver to safely perform an intersection entering operation.

SUMMARY OF THE INVENTION

The present invention is generally directed to systems and methods for assisting a driver of an entering vehicle to safely perform an intersection entering operation. The system includes at least one vehicle sensor and a gap estimator. The vehicle sensor is configured to obtain vehicle information on vehicles approaching the intersection along a main roadway. The gap estimator is configured to estimate gap information relating to a gap between the vehicles based on the vehicle information. The gap information includes a length of the gap, a location of the gap, and a velocity of the gap.

Another aspect of the present invention is directed to a method of obtaining information for use in assisting a driver of an entering vehicle to safely enter an intersection. In the method, vehicle information is obtained on vehicles traveling toward the intersection on a main roadway. Next, gap information is estimated relating to a gap between the vehicles based on the vehicle information. The gap information includes a length of the gap, a location of the gap, and a velocity of the gap.

Other features and benefits that characterize embodiments of the present invention will be apparent upon reading the following detailed description and review of the associated drawings.

DETAILED DESCRIPTION OF THE PREFERRED EMBODIMENTS

Embodiments of the present invention are generally directed to systems and methods that are designed to generate information that can be used to assist a driver of an entering vehicle to safely enter an unsignalized intersection.

Unsignalized Intersections

Figure 1:
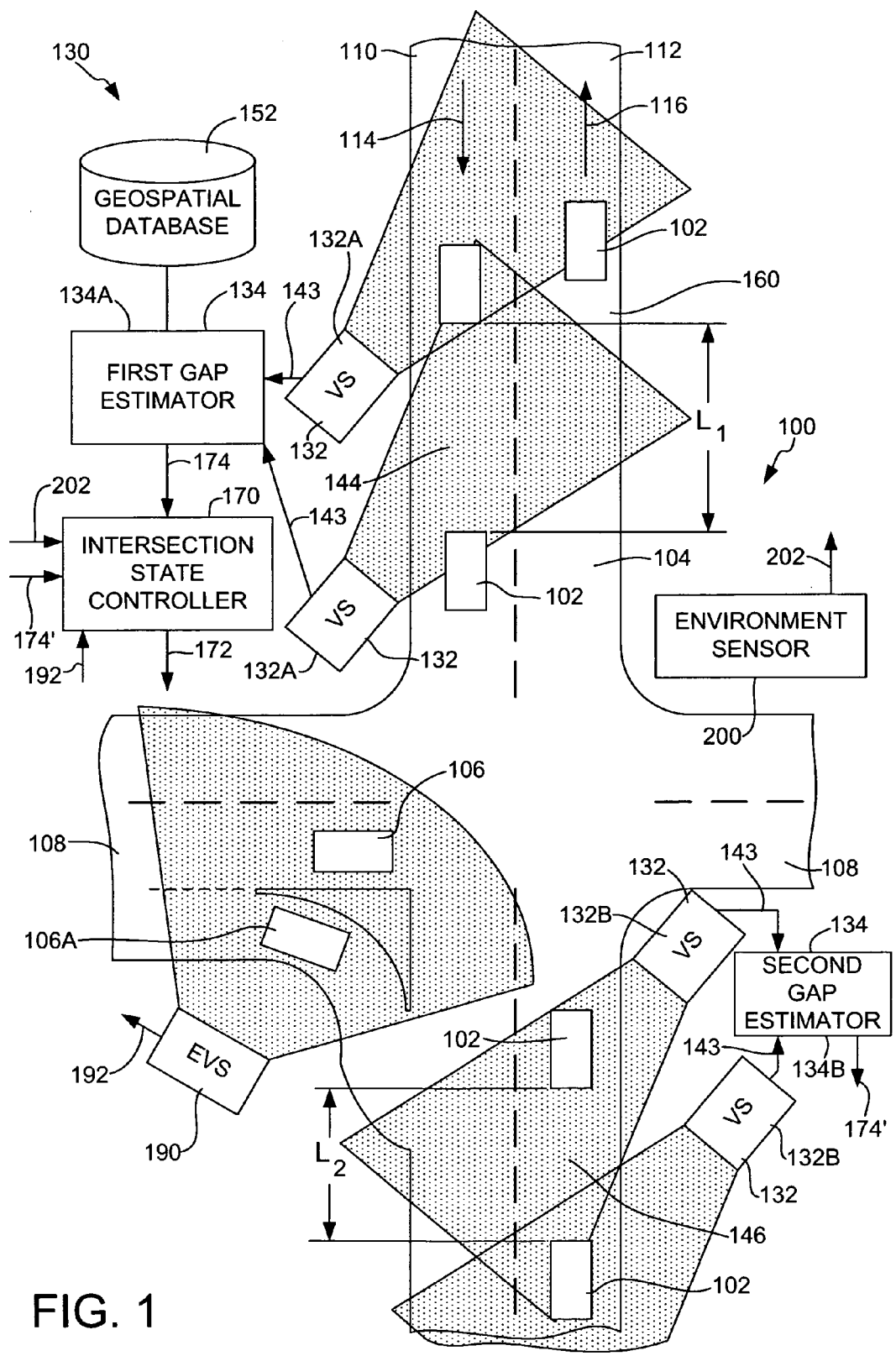
FIGS. 1 and 2 are simplified illustrations of unsignalized intersections and intersection assistance systems in accordance with embodiments of the invention.
Figure 2:
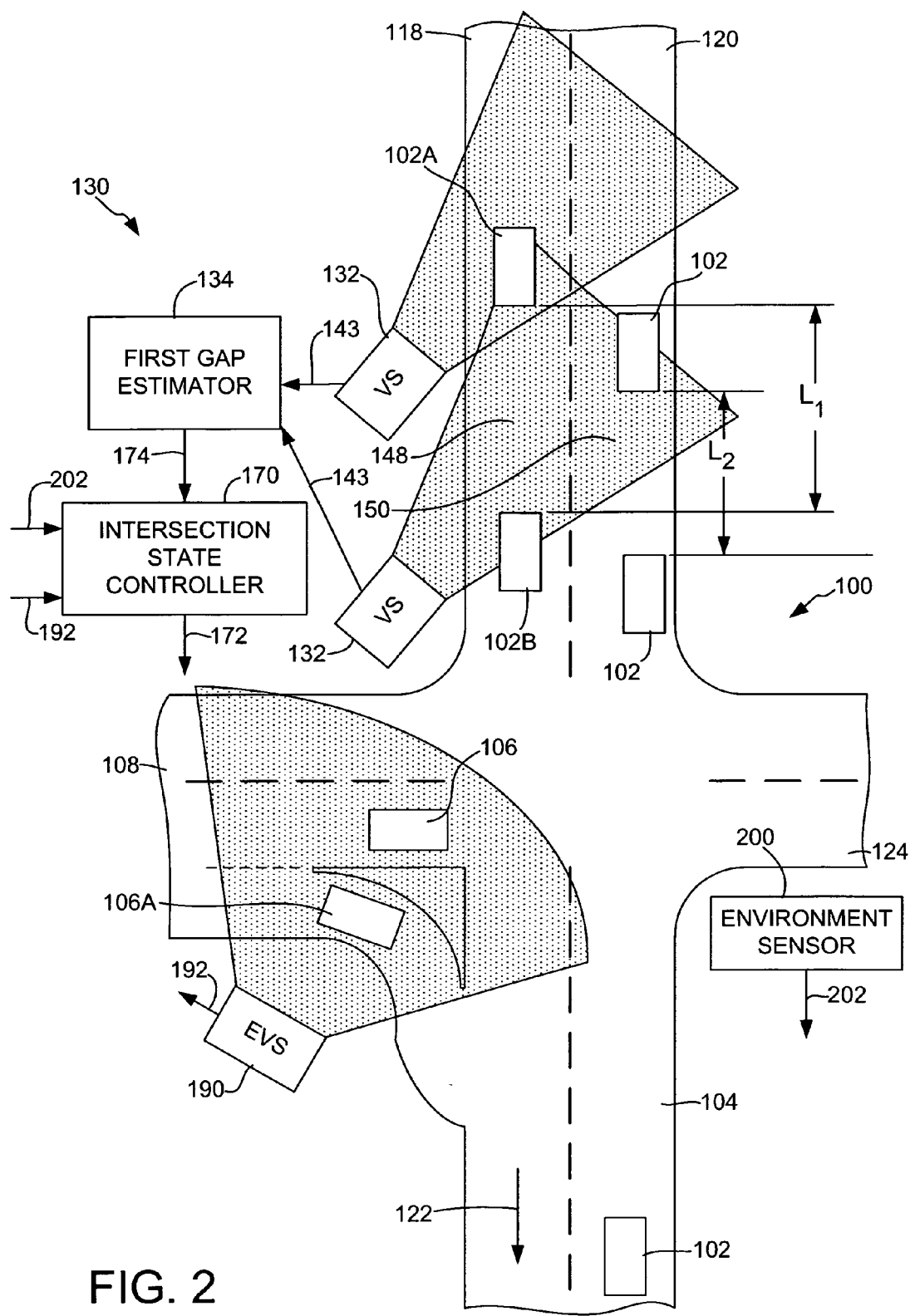

Examples of unsignalized intersections 100 are provided in the simplified illustration of FIGS. 1 and 2. An unsignalized intersection is generally an intersection that does not include an active vehicle gap regulating system (e.g., a stoplight) to regulate gaps in a flow of vehicles 102 approaching the intersection 100 along a main roadway 104 such that entering vehicles 106 trying to enter the intersection from a minor roadway 108, can do so safely. Unsignalized intersections also include thru-stop intersections that include a stop sign or a yield sign for regulating the flow of traffic along the minor roadway 108 at the intersection 100.

In the exemplary unsignalized intersection 100 of FIG. 1, the main roadway 104 is in the form of a two-way highway that respectively includes first and second lanes 110 and 112, in which vehicles 102 travel in opposing directions as indicated by arrows 114 and 116. An entering vehicle 106 positioned at the intersection 100 on the minor roadway 108 can perform intersection entering operations as follows: it can merge into the first lane 110 of the main roadway 104 by making a right turn; it can cross the first lane 110 and merge (i.e., make a left turn) into the second lane 112; or it can cross both the first and second lanes 110 and 112 and continue along the minor roadway 108.

In the exemplary unsignalized intersection 100 of FIG. 2, the main roadway is in the form of a freeway respectively having first and second lanes 118 and 120 (more or less lanes are possible) in which the vehicles 102 travel in the same direction as indicated by arrow 122. The freeway in FIG. 2 also includes a second set of lanes (not shown), which are accessible by a crossover 124. The second set of lanes allow vehicles to travel in a direction that is opposite that of the first and second lanes 118 and 120.

For the intersection 100 of FIG. 2, an entering vehicle 106 can perform intersection entering operations that include merging into the first lane 118 of the main roadway 104 by making a right turn, or crossing the first and second lanes 118 and 120 to enter the crossover 124. If the entering vehicle 106 travels over to the crossover 124, the entering vehicle 106 can choose to turn left onto a lane of the freeway traveling in the direction opposite that indicated by the arrow 122, or continue across the lanes on that side of the freeway to continue along the roadway 108.

Overview of the Present Invention

The present invention can be used to assist the driver of the entering vehicle 106, or possibly the entering vehicle itself, to safely enter the unsignalized intersection 100 without the need for active vehicle gap regulation. Accordingly, the present invention is designed to provide the safety benefits of a regulated intersection (i.e., fewer crashes, opportunities for all drivers to enter/cross the traffic stream, etc.) while minimizing the expense of installing such systems and preventing disruption of the traffic row in the main roadway.

Intersection Assistance System

Figure 3:
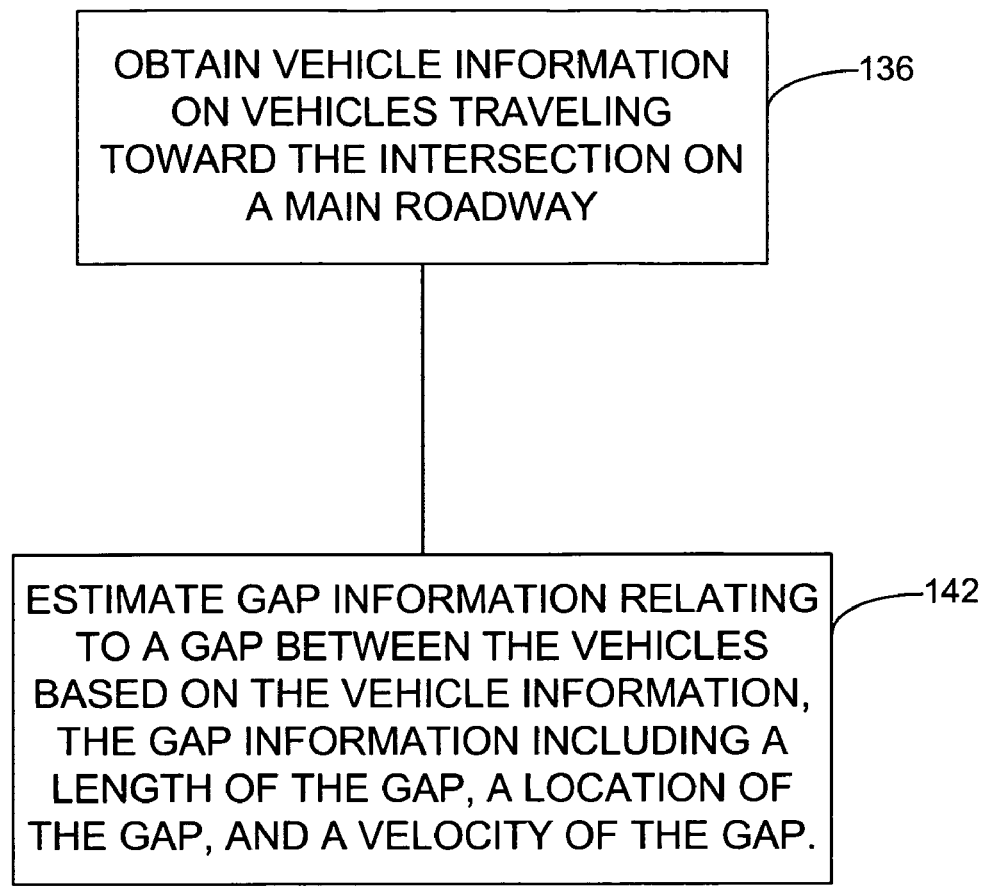
FIG. 3 is a flowchart illustrating a method of obtaining information for use in assisting a driver of an entering vehicle to safely enter an intersection, in accordance with embodiments of the invention.

One embodiment of the present invention is directed to an intersection assistance system 130, embodiments of which are shown in FIGS. 1 and 2, that is configured to perform the method of the flowchart illustrated in FIG. 3. The system 130 generally includes at least one vehicle sensor (VS) 132, and a gap estimator 134. The vehicle sensor or sensors 132 are generally configured to obtain vehicle information on the vehicles 102 travelling along the main roadway 104 toward the intersection 100 to thereby perform step 136 of the method.

The vehicle sensors 132 are positioned upstream of the intersection 100 relative to the direction the vehicles 102 are traveling. One or more vehicle sensors 132 are used to cover a predetermined length of the main roadway 104, which depends on the expected speed of the vehicles 102 traveling along the main roadway 104 and the data processing capabilities of the system 130. Accordingly, the area of coverage provided by the vehicle sensors 132 must be larger for roadways having faster speed limits than those having slower ones.

The vehicle sensors 132, which will be discussed in greater detail below, are generally configured to track the vehicles traveling in one or more of the lanes of the main roadway 104 toward the intersection 100 and thereby obtain tracking data or vehicle information on the vehicles 102. The vehicle information or tracking data obtained by the vehicle sensors 132 can provide, or be processed to provide, a position (relative to the intersection and/or roadway) and a length of each of the vehicles 102 as they travel along the main roadway toward the intersection 100. Information on gaps located between the vehicles approaching the intersection can then be determined, as will be discussed below in greater detail.

Vehicle Sensors

For the intersection of FIG. 1, one or more vehicle sensors 132A (first vehicle sensors) are configured to obtain vehicle information (tracking data) on the vehicles 102 approaching the intersection 100 along the main roadway 104. In accordance with one embodiment of the invention, the one or more first vehicle sensors 132 are configured to obtain vehicle information (first lane vehicle information or tracking data) on the vehicles 102 traveling in the first lane 110. In accordance with another embodiment of the invention, one or more second vehicle sensors 132B are positioned upstream of the intersection 100 relative to the direction 116 the vehicles 102 are traveling in the second lane 112 of the main roadway and are configured to obtain vehicle information (second lane vehicle information or tracking data) on the vehicles 102 traveling in the second lane 112.

Alternatively, one or more vehicle sensors 132 (first vehicle sensors) are configured to obtain vehicle information on multiple lanes (such as first and second lanes 118 and 120) of the main roadway 104, as illustrated in FIG. 2. As above, one or more second vehicle sensors can be positioned to obtain vehicle information or tracking information on the vehicles travelling in the opposite direction in the lanes (not shown) of the main roadway that are divided from the first and second lanes 118 and 120.

The vehicle sensors 132 can be point detection sensors or continuous detection sensors. Point detection sensors include inductive loops, cameras, and laser diode retro-reflective presence detectors. One problem with such point sensors is that they only provide discreet speed/location data, which makes vehicle tracking with such sensors difficult.

Continuous detectors include radar sensors and camera arrays. Continuous sensors have an advantage of allowing for the trajectory of the vehicles to be tracked rather simply in accordance with conventional methods.

Visible light and infrared cameras, while potentially useful as vehicle sensors, have drawbacks that make them less desirable than radar detectors or sensors. These drawbacks include a limited field of view and the potential inability to be used to provide fast and accurate vehicle tracking.

Accordingly, the vehicle sensors 132 preferably utilize continuous vehicle sensors in the form of a radar sensors. One radar sensor that is suitable for use as a vehicle sensor for the system 130 of the present invention is the Eaton® Vorad® EVT-300 radar sensor, which offers all-weather performance at an operating frequency of 24.5 GHz for automotive applications and is less expensive than competing sensors (e.g., Autocruise® LR radar sensor, and Delphi® ACC 3 radar sensor).

The vehicle sensor or sensors 132 can be located in various positions to obtain the desired coverage of the lane or lanes of the main roadway 104. For example, it is possible for a single vehicle sensor (radar sensor or camera) 132 to track multiple vehicles 102 and thereby provide sufficient vehicle information such that the system 130 can provide the desired assistance to a driver of an entering vehicle 106, particularly when the expected speed of the approaching vehicles 102 in the main roadway 104 is slow. However, for faster expected vehicle speeds along the main roadway 104, multiple vehicle sensors 132 can be used to provide sufficient coverage of the main roadway 104 that would allow the system 130 to produce useful and reliable intersection assistance for an entering vehicle 106.

Figure 4:
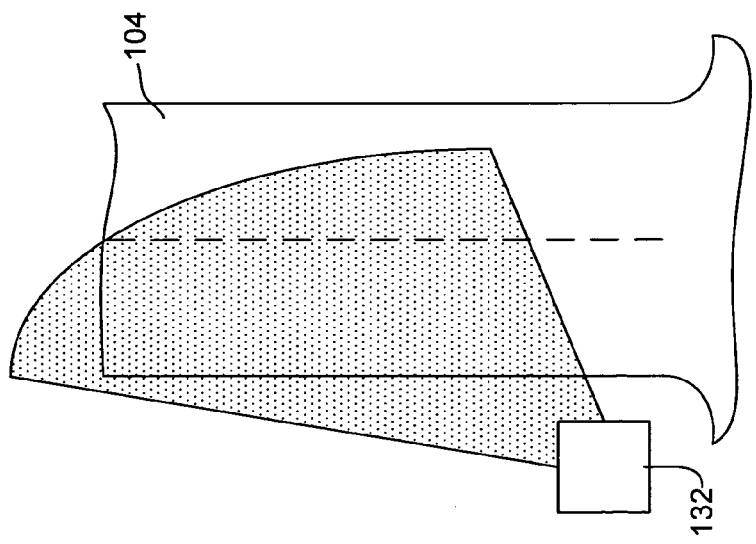
FIGS. 4–6 are simplified top views of a main roadway illustrating positions of vehicle sensors in accordance with embodiments of the invention.
Figure 5:
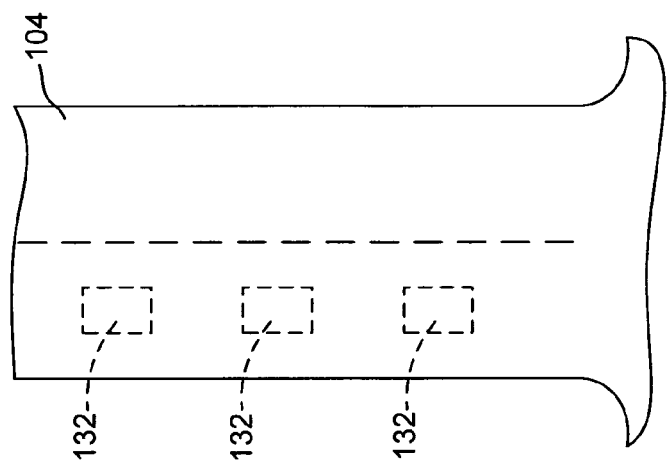
Figure 6:
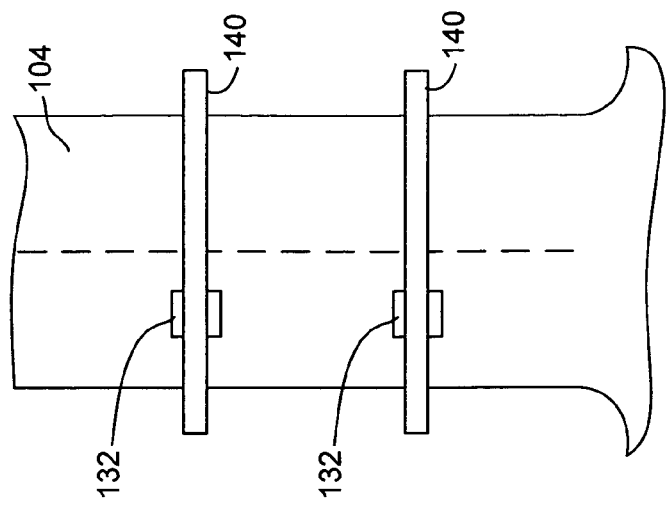

The locations of the vehicle sensor or sensors 132 used to monitor or track vehicles approaching the intersection 100 from a given direction can vary based on the type of sensor used, the coverage area required, the topography of the land near the intersection 100, the number of sensors 132 being used, and other factors. In accordance with one embodiment of the invention, the vehicle sensors (first or second) 132 are located alongside the main roadway 104 (FIGS. 1, 2 and 4), embedded within the main roadway 104 (FIG. 5), or supported above the main roadway 104 (FIG. 6) on a suitable support structure 140, such as poles.

Gap Estimator

The gap estimator 134 is configured to perform step 142 of the method, in which the gap estimator 134 receives the vehicle information or tracking data (signals 143) from the vehicle sensors 132 and use the vehicle information to estimate gap information relating to gaps between the vehicles 102 approaching the intersection 100. In accordance with one embodiment of the invention, the gap information includes a length of the gap ($L_1$), a location of the gap (preferably relative to the intersection), and a velocity the gap is traveling toward the intersection.

Thus, for the exemplary intersection of FIG. 1, the gap estimator (first gap estimator) 134A is configured to estimate gap information (first lane gap information) relating to a first lane gap 144 between the vehicles 102A and 102B approaching the intersection in the first lane 110 based on the first lane vehicle information. The first lane gap information includes a length $L_1$ of the first lane gap 144, a location of the first lane gap 144 (preferably relative to the intersection), and a velocity the first lane gap 144 is traveling toward the intersection 100.

Additionally, one embodiment of the system 130 of FIG. 1 includes a second gap estimator 134B. The second gap estimator 134B, as with the first gap estimator 134A, estimates second lane gap information corresponding to a second lane gap 146 based on the second lane vehicle information. The second lane gap information preferably includes a length $L_2$ of the second lane gap 146, a location of the second lane gap 146 (preferably relative to the intersection), and a velocity the second lane gap 146 is traveling toward the intersection 100. As with the first lane gap information, the second lane gap information estimated by the second gap estimator 134B can be used to determine whether or when the intersection 100 is in a state that would allow the entering vehicle 106 to safely perform a desired intersection entering operation that involves entering the second lane 112 of the intersection 100.

With regard to the intersection 100 of FIG. 2, the gap estimator 134 of the system 130 can operate in the manner discussed above with respect to the gap estimators of FIG. 1, to obtain gap information relating to gaps in the individual lanes, such as the first lane 118 or the second lane 120. Thus, the gap estimator 134 is configured to estimate first and second lane gap information including a gap length ($L_1$) of a first lane gap 148 and a gap length ($L_2$) of the second lane gap 150. Additionally, location and velocity information on the gaps 148 and 150 is also preferably included in the gap information.

Tracking Data Compensations and Fault Detection

It may be necessary to improve the vehicle information or tracking data provided by the vehicle sensors 132 to the gap estimators 134 in order to improve the accuracy and speed at which the gap estimators 134 can estimate the gap information. In accordance with one embodiment of the invention, the system 130 includes a geospatial database 152 (FIG. 1) that contains object data including location information (3-dimensional coordinates) and object information used to identify a particular real world object that is present on the main roadway 104 or in the area surrounding the main roadway 104. The mapped objects generally include non-vehicle objects, such as lane boundaries of the main roadway, sign posts, shrubbery, mounds, road barriers, boundaries of non-vehicle traveling areas, and other objects within the coverage area of the vehicle sensors (radar sensors) 132, for example. The object data contained in the geospatial database 152 is used to filter the vehicle information or tracking data obtained by the vehicle sensors 132 to thereby reduce the amount of vehicle information that must be processed by the gap estimator 134 to estimate the gap information.

For instance, the geospatial database 152 may include object data corresponding to a tree that is located adjacent to the main roadway 104, from which a precise location and properties (height, width, etc.) is obtainable. If that tree is within the range of a radar sensor based vehicle sensor 132, the vehicle information produced by the radar sensor would include the position of the tree.

In order to reduce the amount of object data contained in the geospatial database 152, some object data define boundaries of non-vehicle traveling areas in order to eliminate the need to define each of the objects contained within the non-vehicle traveling area. Thus, for example, some of the object data may correspond to a boundary of a median of the main roadway, within which no vehicles can travel, making it unnecessary to define each object (e.g., a tree, a signpost, etc.) that exists within the median. The vehicle information or tracking data obtained by the vehicle sensors 132 can then be filtered by eliminating all detected targets within the vehicle information that are located within the boundary defined by the object data.

The filtering of the vehicle information by the gap estimator 134 using the object data in the geospatial database 152 is performed by comparing the object data to the vehicle information produced by the vehicle sensors 132. Object data and detected targets defined by the vehicle information that correlate with each other (i.e., appear to correspond to the same real world objects), are eliminated or filtered out as being non-vehicle related. The gap estimator 134 then processes the remaining filtered targets of the vehicle information to estimate the gap information.

An example of a suitable geospatial database for use with the present invention is described in U.S. patent application Ser. No. 10/091,182, which is incorporated herein by reference in its entirety.

As mentioned above, the gap estimators 134 are configured to process the vehicle tracking information obtained by the vehicle sensors 132 and estimate gap information based thereon. The gap estimators 134 are preferably configured to maintain a flow balance within the coverage area (as indicated by shading) of the intersection (i.e., number of cars in=number of cars out+number of cars stopped). However, problems can arise when a vehicle is "lost" or is no longer tracked by the vehicle sensors 132. This can occur if a vehicle stops within a gap between the coverage of the vehicle sensors 132, such as gap 160 (FIG. 1), or a vehicle sensor 132 becomes inoperable.

In accordance with one embodiment of the invention, the gap estimators 134 are configured to implement a Kalman filter-based vehicle tracker where each vehicle 102 entering the vicinity of the intersection 100, or coverage area provided by the vehicle sensors 132, is assigned a unique ID, and the location, speed, and lane of travel of the vehicle 102 are tracked for the entire time the vehicle 102 is within the confines of the coverage area. If a vehicle "disappears" from the view of the vehicle sensor or sensors 132, the vehicle's position, speed, acceleration, heading, and lane of travel are estimated by the Kalman filter-based tracker using prior vehicle trajectory data to form an estimated vehicle target. When the actual vehicle 102 "reappears" in the field of view of the vehicle sensors 132, the trajectory of the estimated vehicle target is compared to the detected vehicle 102 as provided by the vehicle sensor 132. A good correlation between the estimated vehicle target and the detected target or vehicle 102 result in the unification of the two targets, whereas poor correlation results in the assignment of a new ID to the newly detected target. This approach is conservative, as safety critical systems should be.

This Kalman filter-based vehicle tracker aspect of the gap estimator provides fault detection/fault tolerance capability to the system 130. The likely fault of the vehicle sensors 132 will be the loss of a vehicle sensor 132 due to component failure or vehicle collision. In this case, the processing of the vehicle sensor data either by the gap estimator 134 or the vehicle sensor 132 will not identify vehicle targets 102 on the main roadway 104. In the absence of this data, the vehicle tracker function of the gap estimator 134 will continue to estimate the trajectory of vehicles 102 within the field of view of the vehicle sensors 132 and when the vehicles 102 move into the field of view of an operational vehicle sensor 132, the Kalman filter will rectify the estimated vehicle target and the detected target, thereby tolerating faults. Preferably, a diagnostic algorithm runs in the background, monitoring discrepancies between vehicle sensor data (vehicle information) and the Kalman filter-based estimator. The frequent loss of data in a single vehicle sensor zone indicates a vehicle sensor fault, which, once detected, the system 130 preferably automatically reports the problem via a radio signal, an email message, etc., to have the system serviced.

Intersection State Controller

One embodiment of the system 130 of the present invention includes an intersection state controller 170 (FIGS. 1 and 2) that is configured to generate a state output 172 based on the gap information (signal 174) estimated by the one or more gap estimators 134. The state output 172 indicates when the entering vehicle 106 can safely perform an intersection entering operation.

With the gap information 174 (position, length and velocity) of the gaps in the main roadway 104 established by the one or more gap estimators 134, the intersection state controller 170 can use the gap information to determine when each lane gap of the main roadway 104 will overlay the intersection 100. Thus, a first lane gap period defined by starting and ending times when the first lane gap 144 (FIG. 1) or 148 (FIG. 2) will overlay the intersection 100, can be established by the intersection state controller 170. Similarly, a second lane gap period defined by starting and ending times when the second lane gap 146 (FIG. 1) or 150 (FIG. 2) will overlay the intersection 100 can be established by the intersection state controller 170. Additionally, gap overlaying periods defined by starting and ending times during which the lane gaps (e.g., the first and second lane gaps) overlay each other at the intersection 100 (i.e., are simultaneously at the intersection), can also be determined by the intersection state controller 170 based on the corresponding lane gap period.

The intersection state controller 170 is further configured to compare the lane gap periods or gap overlaying periods to corresponding threshold gap periods to determine the state output 172. In general, the threshold gap periods are set based on an estimated period of time that one or more lane gaps must exist at the intersection 100, or proximate thereto, for the entering vehicle 106 to perform an intersection entering operation (i.e., merge into a lane of the roadway, cross lanes of the roadway, cross lanes of the roadway and merge into a lane of the roadway) safely.

Each threshold gap period can be a fixed period that is set based on empirical data or a variable period. The empirical data used to set the threshold gap periods generally includes the period of time required for the system 130 to determine the lane gap periods and/or gap overlaying periods, make the comparison between the lane gap periods or gap overlaying periods and the threshold gap period, and display or communicate information corresponding to the state output to the entering vehicle or the driver of the entering vehicle. Additionally, the threshold gap period must take into account a period of time required for the driver of the entering vehicle to react to the state output communication and perform the intersection entering operation.

The variance of a threshold gap period, as will be explained in greater detail below, can be based on weather conditions at the intersection 100, road conditions at the intersection 100, the type of entering vehicle 106, entering vehicle driver information, and other factors.

Additionally, the threshold gap periods can vary depending on the intersection entering operation to be performed by the driver of the entering vehicle 106. For example, a threshold gap period that is set for a lane merging operation, during which the entering vehicle 106 merges into a lane of the main roadway 104, may be longer than the threshold gap period set for a lane crossing operation.

Lane Merging

For a lane merging operation, in which the entering vehicle, such as entering vehicle 106A is positioned to merge (i.e., make a right turn) into a lane (first lane 110 of FIG. 1, or first lane 118 of FIG. 2) of the main roadway 104, the state output 172 can be based solely on a comparison between a threshold gap period and the first lane gap period for the corresponding first lane gaps 144 (FIG. 1) and 148 (FIG. 2). Thus, when the threshold gap period is set to nine seconds, for example, the first lane gap period must meet or exceed nine seconds for the state output 170 to indicate that the main roadway 104 is sufficiently clear for the merging operation. If the first lane gap period is less than nine seconds, then the state output 170 is set to an unclear state and the entering vehicle 106 is preferably warned that it is currently unsafe to perform the merging operation.

Lane Crossing

Some intersection entering operations require the intersection state controller 170 to analyze the lane gap periods corresponding to multiple lanes of the roadway 104. For instance, when the entering vehicle (such as 106B) is positioned to cross one or more lanes of the main roadway 104 of FIG. 1 or 2, the intersection state controller 170 must compare the gap overlaying period corresponding to the start and ending times during which the first and second lane gaps (144 and 146 of FIG. 1, and 148 and 150 of FIG. 2) simultaneously overlay the intersection 100. The intersection state controller 170 compares the corresponding threshold gap period for such a crossing to the gap overlaying period and provides either a clear state output or an unclear state output in response thereto that is respectively indicative that the lane gaps are sufficient to allow the entering vehicle to make the lane crossings safely, or insufficient to allow the entering vehicle to safely make the lane crossings.

Lane Crossing and Merging

Another possible lane entering operation to be performed by the entering vehicle 106 is a combination of a lane crossing and a lane merging. For instance, the entering vehicle 106 may wish to cross the first lane 110 and make a left turn to merge into the second lane 112 of the main roadway 104 of FIG. 1. In that case, the threshold gap period may be set differently from that used for the lane crossing operation due to a need to have a longer second lane gap period to ensure a safe merge into the second lane 112.

In accordance with one embodiment of the invention, a two-part threshold gap period may be implemented, in which a first threshold gap period is established for the crossing of the first lane 110 and the entering of the second lane 112, and a second threshold gap period is established to cover the completion of the merger of the entering vehicle 106 into the second lane 112. Here, the first threshold gap period is set in accordance with a period of time that is required to allow the entering vehicle 106 to safely cross the first lane 110 and enter the second lane 112, after which there is no longer a concern as to whether the first lane gap 144 still overlies the intersection 100. Subsequently, the only concern is whether the second lane gap 146 still remains at, or proximate to, the intersection 100 such that the entering vehicle 106 can safely complete a merger into that lane. Thus, the second threshold gap period is set in accordance with the estimated time period required for the entering vehicle 106 to safely complete the merger into the second lane 112.

State Output Communication

Figure 7:
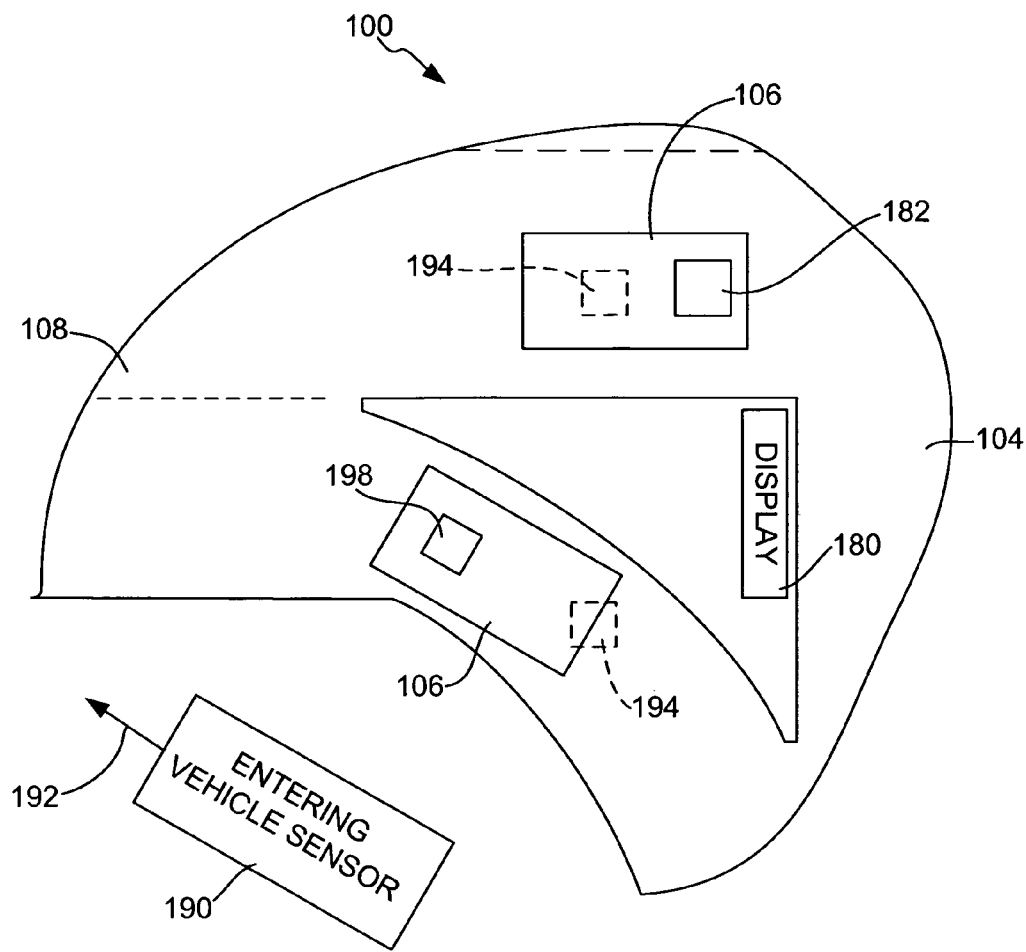
FIG. 7 is a magnified view of a portion of the intersections shown in FIGS. 1 and 2, which illustrates embodiments of the intersection assistance system.

The state output 172 generated by the intersection state controller 170 is preferably communicated to the driver of the entering vehicle 106, or to the entering vehicle 106 itself, such that the state output 172 can be used to ensure that the intersection entering operation can be performed safely. In accordance with one embodiment of the invention, information regarding the state output (clear or unclear state output) is provided to the driver of the entering vehicle 106 on a display 180 located at the intersection 100, or provided to the entering vehicle 106, which in turn produces the information on a display 182 that is located within the entering vehicle 106, as shown in FIG. 7, which is a magnified view of a portion of the intersections shown in FIGS. 1 and 2.

Furthermore, it is envisioned that entering vehicles could be equipped to perform fully automated driving operations including intersection entering operations. The system 130 of the present invention could be used to communicate the state output 172 to such an entering vehicle 106, which in turn could perform the intersection entering operation when the state output 172 from the intersection state controller 170 indicates that it is safe to do so.

State Output Variables

The state output 172 produced by the intersection state controller 170 can also be based on information that is in addition to the gap information 174. Such additional information can include entering vehicle information, entering driver information, and/or environment information, which will be explained below in greater detail. In general, such additional information is obtained by sensors of the system 130 and is used to vary the threshold gap period or periods that are used by the intersection state controller 170 to determine the state output 172.

Entering Vehicle Sensor

In accordance with one embodiment of the invention, the system 130 includes an entering vehicle sensor (EVS) 190 that is configured to obtain information regarding the entering vehicle 106 and/or a driver of the entering vehicle 106 that can be provided to the intersection state controller 107, as indicated by signal 192, and used in the determination of the state output 172. The entering vehicle sensor 190 may comprise a plurality of sensors configured to obtain the desired information.

One embodiment of the entering vehicle sensor 190 includes one or more vehicle presence sensors (e.g., point detection sensors) for detecting the presence of an entering vehicle 106 at the intersection. Exemplary vehicle presence sensors 194 are shown in FIG. 7 as being embedded in the minor roadway 108. Such vehicle presence sensors 194 are useful in detecting a presence as well as an absence of entering vehicles 106 at the intersections 100. As a result, distraction of drivers on the main roadway 104 can be minimized by triggering the display 180 (FIG. 7) only during times when an entering vehicle 106 is present at the intersection 100. Additionally, energy can be saved when the display 180 is operated only when an entering vehicle 106 is present at the intersection 100.

In accordance with another embodiment of the invention, the entering vehicle sensor 190 includes sensors configured to establish a vehicle type for the entering vehicle 106. Height information for the entering vehicle can be acquired using a vertical scan of the entering vehicle 106, which is fused with a length/position information determined by a horizontal scan of the entering vehicle 106. The collected vehicle information can then be used to classify the entering vehicle 106 as belonging to one or more categories or vehicle types including a large vehicle, a small vehicle, a passenger vehicle, a semi-tractor, a utility vehicle, a tractor, a motorcycle, a motor home, and a trailer hauling vehicle. Other vehicle types can also be used.

In accordance with one embodiment of the invention, the intersection state controller 170 varies the threshold gap period according to the vehicle type. For instance, if the entering vehicle information indicates that the entering vehicle is a large vehicle or a semi-tractor, the intersection state controller 170 will increase the threshold gap period to accommodate for the likely longer period of time that is required for the entering vehicle 106 to safely perform the desired intersection entering operation. On the other hand, if the entering vehicle information indicates that the entering vehicle is a small vehicle or a motorcycle, the intersection state controller 170 can decrease the threshold gap period to accommodate for the likely shorter period of time that is required for the entering vehicle 106 to safely perform the desired intersection entering operation.

In accordance with another embodiment of the invention, the vehicle type and/or driver information is provided directly to the entering vehicle sensor 190 of the system 130 by the driver of the entering vehicle 106 through a suitable interface, which can then be used in the determination of the state output 172 produced by the intersection state controller 170. In accordance with another embodiment of the invention, such driver/vehicle information can be stored in memory 198 (e.g., a Radio Frequency Identification or RFID tag, or smart card) on the entering vehicle 106 and communicated to the entering vehicle sensor 190 automatically through the interface through a wireless communication. Alternatively, the vehicle sensor 190 can include a license plate scanner configured to "read" the license plate of the entering vehicle and obtain the corresponding driver/vehicle information from a database.

In addition to the vehicle type described above, the vehicle information communicated from the driver/entering vehicle can include a make/model of the entering vehicle, a year of the entering vehicle, an engine/transmission characteristic of the entering vehicle, road-tire friction levels for the entering vehicle, a license plate number, a vehicle identification, and other entering vehicle information. The driver information can include an indication as to the intersection entering operation the driver wishes to perform (e.g., a left turn, a right turn, or a crossing), driver demographics (e.g., age, gender, information regarding driving habits), a driving record for the driver, a driver's license number, an identification of the driver, and a driver setting (e.g., predefined threshold gap periods for particular intersection entering operations). As above, this information can be used by the intersection state controller 170 to determine the threshold gap periods and, thus, the state output 172.

Environment Sensor

In accordance with yet another embodiment of the invention, the system 130 includes an environment sensor 200 (FIGS. 1 and 2) configured to obtain environmental information (signal 202) that is relevant to the intersection 100 and used by the intersection state controller 170 to determine the state output 172 to provide to an entering vehicle 106. In accordance with one embodiment of the invention, the environmental information includes weather information relating to the intersection 100. Examples of the weather information include a temperature, a humidity level, a wind speed, a wind direction, a relative humidity, an atmospheric pressure, a precipitation rate, a precipitation type, and a visibility. For instance, when the temperature and precipitation values for the intersection 100 indicate that the main roadway 104 may be icy, the intersection state controller 170 increases the threshold gap periods to provide more time for the entering vehicle 106 to complete a desired intersection entering operation.

In accordance with another embodiment of the invention, the environment information includes road information relating to the main and minor roadways 104 and 108 of the intersection 100. Examples of road information include a moisture content of the roadways, a temperature of the roadways, a moisture type on the roadways, and a traction level for the roadways. Such road information is generally used to increase the threshold gap periods used by the intersection state controller 170 to determine the state output 172. For instance, when the road information indicates that the roadways have a high moisture content, the intersection state controller can increase the threshold gap periods to accommodate for the potential slippery conditions that may exist, which can necessitate a longer period of time to complete an intersection entering operation.

Communications between the devices of system 130 can be accomplished through either hard-wired connections or wireless transmission, in accordance with conventional methods.

Although the present invention has been described with reference to preferred embodiments, workers skilled in the art will recognize that changes may be made in form and detail without departing from the spirit and scope of the invention. For example, it should be understood that the components of the system 130 of the present invention illustrated as blocks in FIGS. 1 and 2 are intended to illustrate a function rather than a particular component used to carry out the function. Thus, the function performed by the blocks of the system 130 could be implemented by one or more components. Additionally, although the system 130 of the present invention has been generally described as being operative with unsignalized intersections, it can be used to assist the driver of the entering vehicle 106 to merge into the main roadway 104 of signalized intersections, such as those using an active vehicle gap regulating system (e.g., a stoplight). For instance, if the intersection of FIG. 1 included a stoplight that controlled the flow of traffic through the intersection 100 along the main roadway 104 and the entering vehicle 106 is stopped at the stoplight, the present invention can be used to assist the driver of the entering vehicle 106 to safely merge (i.e., make a right turn) into the flow of traffic along the main roadway 104.

What is claimed is:

1. An intersection assistance system comprising:
at least one vehicle sensor configured to obtain vehicle information on vehicles approaching an intersection on a main roadway, wherein the intersection includes the main roadway crossing another roadway; and
a gap estimator configured to estimate gap information relating to a gap between the vehicles based on the vehicle information, the gap information including a length of the gap, a location of the gap, and a velocity of the gap.

2. The system of claim 1 including an intersection state controller configured to generate a state output based on the gap information that is indicative of whether an entering vehicle can safely perform an intersection entering operation.

3. The system of claim 2, wherein the intersection state controller is configured to calculate a gap period corresponding to a time at which the gap is at the intersection, based on the gap information.

4. The system of claim 3, wherein the state output is generated based on a comparison between the gap period and a threshold gap period.

5. The system of claim 4, wherein the gap period is set based on information selected from a group consisting of the intersection entering operation to be performed by the entering vehicle, environmental information relating to an environment of the intersection, and entering vehicle information relating to the entering vehicle.

6. The system of claim 1, wherein:
the vehicle sensor includes a radar sensor configured to detect targets within the main roadway;
the system includes a geospatial database containing object data corresponding to one of real world objects and boundaries of non-vehicle traveling areas that are within a range of the radar sensor; and
the gap estimator is configured to filter out targets detected by the radar sensor that correspond to the object data in the geospatial database, and estimate the gap information based on the remaining targets detected by the radar sensor.

7. The system of claim 2 including an entering vehicle sensor configured to detect a vehicle type for the entering vehicle selected from a group consisting of a large vehicle, a small vehicle, a passenger vehicle, a semi-tractor, a utility vehicle, a tractor, a motorcycle, a motor home, and a trailer hauling vehicle, wherein the state output is based on the vehicle type.

8. The system of claim 2, wherein the entering vehicle sensor is configured to detect driver information corresponding to a driver of the entering vehicle selected from a group consisting of an age of the driver, a gender of the driver, a driver setting, an intent of the driver, and a driving record for the driver, wherein the state output is based on the driver information.

9. The system of claim 2 including an environment sensor configured to obtain environmental information on an environment of the intersection selected from a group consisting of a temperature, a humidity level, a wind speed, a wind direction, a relative humidity, an atmospheric pressure, a precipitation rate, a precipitation type, and a visibility, wherein the state output is based on the environmental information.

10. The system of claim 2 including an environment sensor configured to obtain road information selected from a group consisting of a moisture content of the road, a temperature of the road, a moisture type, and a traction level for the road, wherein the state output is based on the road information.

11. The system of claim 2 including a display that is indicative of the state output.

12. An intersection assistance system comprising:
at least one first vehicle sensor configured to obtain first lane vehicle information on vehicles approaching an intersection in a first lane of a road;
a first gap estimator configured to estimate first lane gap information corresponding to a first lane gap between the vehicles traveling in the first lane based on the first lane vehicle information, the first lane gap information including a length of the first lane gap, a location of the first lane gap, and a velocity of the first lane gap;
at least one second vehicle sensor configured to obtain second lane vehicle information on vehicles approaching the intersection in a second lane of the road; and
a second gap estimator configured to estimate second lane gap information corresponding to a second lane gap between the vehicles traveling in the second lane based on the second lane vehicle information, the second lane gap information including a length of the second lane gap, a location of the second lane gap, and a velocity of the second lane gap.

13. The system of claim 12 including an intersection state controller configured to generate a state output based on at least one of the first lane gap information and the second lane gap information, wherein the state output is indicative of whether an entering vehicle can safely perform an intersection entering operation.

14. The system of claim 13, wherein the intersection state controller is configured to calculate a first gap period corresponding to a time at which the first lane gap is at the intersection based on the first lane gap information, and a second gap period corresponding to a time at which the second lane gap is at the intersection based on the second lane gap information.

15. The system of claim 14, wherein the state output is generated based on a comparison between the first lane gap period and a threshold gap period.

16. The system of claim 15, wherein the state output is generated based on a comparison between the second lane gap period and a threshold gap period.

17. The system of claim 14, wherein the intersection state controller is further configured to calculate a gap overlaying period corresponding to a time during which the first and second lane gaps overlay each other at the intersection.

18. The system of claim 17, wherein the state output is generated based on a comparison between the overlaying gap period and a threshold gap period.

19. The system of claim 17, wherein the threshold gap period is set based on information selected from a group consisting of the intersection entering operation to be performed by the entering vehicle, environmental information relating to an environment of the intersection, and entering vehicle information relating to the entering vehicle.

20. The system of claim 12, wherein:
the first and second vehicle sensors respectively include first and second radar sensors each configured to detect targets within the first and second lanes;
the system including a geospatial database containing object data corresponding to one of real world non-vehicle objects and boundaries of non-vehicle traveling areas that are within ranges of the first and second radar sensors; and
the first and second gap estimators are configured to respectively filter out targets detected by the first and second radar sensors that correspond to the object data in the geospatial database, and estimate the first and second lane gap information based on the filtered targets detected by the first and second radar sensors.

21. The system of claim 13 including an entering vehicle sensor configured to detect a vehicle type for the entering vehicle selected from a group consisting of a large vehicle, a small vehicle, a passenger vehicle, a semi-tractor, a utility vehicle, a tractor, a motorcycle, a motor home, a trailer hauling vehicle, and a bicycle, wherein the state output is based on the vehicle type.

22. The system of claim 13 including an entering vehicle sensor configured to detect driver information corresponding to a driver of the entering vehicle selected from a group consisting of an identity of the driver, an age of the driver, a gender of the driver, a driver setting, and a driving record for the driver, wherein the state output is based on the driver information.

23. The system of claim 13 including an environment sensor configured to obtain environmental information on an environment of the intersection selected from a group consisting of a temperature, a humidity level, a wind speed, a wind direction, a relative humidity, an atmospheric pressure, a precipitation rate, and a precipitation type, wherein the state output is based on the environmental information.

24. The system of claim 13 including an environment sensor configured to obtain road information selected from a group consisting of a moisture content of the road, a temperature of the road, a moisture type, and a friction level for the road, wherein the state output is based on the road information.

25. The system of claim 13 including a display of information indicative of the state output.

26. A method of obtaining information for use in assisting a driver of an entering vehicle to safely enter an intersection, the method comprising steps of:
a) obtaining vehicle information on vehicles traveling on a main roadway toward an intersection including the main roadway crossing another roadway; and
b) estimating gap information relating to a gap between the vehicles based on the vehicle information, the gap information including a length of the gap, a location of the gap, and the velocity of the gap.

27. The method of claim 26 including a step of c) generating a state output based on the gap information that is indicative of whether the entering vehicle can safely perform an intersection entering operation.

28. The method of claim 27, wherein the generating step c) includes calculating a gap period corresponding to a time at which the gap is at the intersection based on the gap information.

29. The method of claim 28, wherein the generating step c) includes comparing the gap period to a threshold gap period and generating the state output based thereon.

30. The method of claim 29 including setting the threshold gap period based on information selected from a group consisting of the intersection entering operation to be performed by the entering vehicle, environmental information relating to an environment of the intersection, and entering vehicle information relating to the entering vehicle.

31. The method of claim 26, wherein:
the obtaining step a) includes detecting targets within the main roadway with a radar sensor; and
the estimate step b) includes:
filtering out targets detected by the radar sensor that correspond to object data contained in a geospatial database, the object data corresponding to one of real world non-vehicle objects and boundaries of non-vehicle traveling areas that are within a range of the radar sensor; and
estimating the gap information based on the remaining targets detected by the radar sensor.

32. The method of claim 27 including detecting a vehicle type for the entering vehicle selected from a group consisting of a large vehicle, a small vehicle, a passenger vehicle, a semi-tractor, a utility vehicle, a tractor, a motorcycle, a motor home, and a trailer hauling vehicle, wherein the state output is generated in the generating step c) based on the vehicle type.

33. The method of claim 27 including obtaining driver information corresponding to a driver of the entering vehicle selected from a group consisting of an identity of the driver, an age of the driver, a gender of the driver, a driver setting, a driving record for the driver, wherein the state output generated in the generating step c) is based on the driver information.

34. The method of claim 27 including obtaining environmental information on an environment of the intersection selected from a group consisting of a temperature, a humidity level, a wind speed, a wind direction, a relative humidity, an atmospheric pressure, a precipitation rate and a precipitation type, wherein the state output generated in the generating step c) is based on the environmental information.

35. The method of claim 27 including obtaining road information corresponding to the main roadway selected from a group consisting of a moisture content of the road, a temperature of the road, a moisture type, and a friction level for the road, wherein the state output generated in the generating step c) is based on the road information.

36. The method of claim 27 including displaying assistance information indicative of the state output.

37. An intersection assistance system comprising:
at least one first vehicle sensor configured to obtain first lane vehicle information on vehicles approaching an intersection in a first lane of a road;
a first gap estimator configured to estimate first lane gap information corresponding to a first lane gap between the vehicles traveling in the first lane based on the first lane vehicle information, the first lane gap information including a length of the first lane gap, a location of the first lane gap, and a velocity of the first lane gap;
at least one second vehicle sensor configured to obtain second lane vehicle information on vehicles approaching the intersection in a second lane of the road;
a second gap estimator configured to estimate second lane gap information corresponding to a second lane gap between the vehicles traveling in the second lane based on the second lane vehicle information, the second lane gap information including a length of the second lane gap, a location of the second lane gap, and a velocity of the second lane gap; and
an intersection state controller configured to generate a state output based on at least one of the first lane gap information and the second lane gap information, wherein the state output is indicative of whether an entering vehicle can safely perform an intersection entering operation, and wherein the intersection state controller is configured to calculate a first gap period corresponding to a time at which the first lane gap is at the intersection based on the first lane gap information, and a second gap period corresponding to a time at which the second lane gap is at the intersection based on the second lane gap information, and wherein the intersection state controller is further configured to calculate a gap overlaying period corresponding to a time during which the first and second lane gaps overlay each other at the intersection.

* * * * *